United States Patent
Mendis et al.

(10) Patent No.: US 6,958,776 B2
(45) Date of Patent: Oct. 25, 2005

(54) METHOD AND APPARATUS OF CONTROLLING A PIXEL RESET LEVEL FOR REDUCING AN IMAGE LAG IN A CMOS SENSOR

(75) Inventors: Sunetra K. Mendis, Palo Alto, CA (US); Tzi-Hsiung Shu, San Jose, CA (US)

(73) Assignee: Vanguard International Semiconductor Corp., Hsinchu (TW)

( * ) Notice: Subject to any disclaimer, the term of this patent is extended or adjusted under 35 U.S.C. 154(b) by 793 days.

(21) Appl. No.: 09/886,776

(22) Filed: Jun. 21, 2001

(65) Prior Publication Data

US 2002/0018133 A1    Feb. 14, 2002

Related U.S. Application Data

(60) Provisional application No. 60/217,534, filed on Jul. 12, 2000.

(51) Int. Cl.[7] .......................... H04N 3/14; H04N 9/64; H04N 5/20; H01L 27/00
(52) U.S. Cl. ...................... 348/308; 348/248; 348/255; 250/208.1
(58) Field of Search ......................... 348/216.1, 217.1, 348/307, 308, 241, 242, 248, 249, 250, 255, 348/257, 258, 294, 296; 250/208.1; 358/513, 358/514

(56) References Cited

U.S. PATENT DOCUMENTS

| | | | | |
|---|---|---|---|---|
| 5,376,782 A | * | 12/1994 | Ikeda et al. | 250/208.1 |
| 5,576,763 A | * | 11/1996 | Ackland et al. | 348/308 |
| 6,384,394 B1 | * | 5/2002 | Afghahi | 250/208.1 |
| 6,566,697 B1 | * | 5/2003 | Fox et al. | 257/292 |
| 6,667,768 B1 | * | 12/2003 | Fossum | 348/308 |
| 6,721,464 B2 | * | 4/2004 | Pain et al. | 382/312 |
| 6,727,946 B1 | * | 4/2004 | Zhao et al. | 348/308 |
| 6,777,660 B1 | * | 8/2004 | Lee | 348/308 |
| 2003/0103153 A1 | * | 6/2003 | Fossum | 348/308 |
| 2003/0133625 A1 | * | 7/2003 | Pain et al. | 382/288 |

(Continued)

FOREIGN PATENT DOCUMENTS

EP    1117249 A2 *  7/2001  ............ H04N 3/15

OTHER PUBLICATIONS

Stevens, E.G. et al.; "A 1-Megapixel, Progressive-Scan Image Sensor with Antiblooming Control and Lag-Free Operation"; M 1991; IEEE Transactions on Electron Devices; vol. 38, No. 5; pp. 981-988.*

(Continued)

*Primary Examiner*—Wendy R. Garber
*Assistant Examiner*—John M. Villecco
(74) *Attorney, Agent, or Firm*—J.C. Patents

(57) ABSTRACT

The invention provides a method and apparatus for reducing image lag in CMOS active pixel sensors at low light levels by controlling the reset level. By ensuring that the reset level is independent of the preceding signal level, the problem of image lag can be avoided. Always resetting a photodiode to a fixed voltage is a hard reset. The maximum signal swing is limited by the reset level and the column readout amplifier. If the column circuits are not modified, using hard reset can reduce the maximum signal swing. However in dark images only a portion of the full scale is used. Therefore the amplifier gain setting can be used to determine whether to use a hard reset or soft reset. This method and apparatus for using hard or soft reset dependent on signal level improves image quality at low light levels without compromising performance at high illumination.

20 Claims, 2 Drawing Sheets

U.S. PATENT DOCUMENTS

2003/0227018 A1 * 12/2003 Fox .............................. 257/59
2004/0036008 A1 * 2/2004 Barna ...................... 250/208.1
2004/0174450 A1 * 9/2004 Lee et al. ................... 348/308

OTHER PUBLICATIONS

Stevens, E.G. et al.; "A Lag-Free 1024×1024 Progressive Scan Interline CCD Image Sensor with Antiblooming and Exposure Control"; 1989; IEEE.*

Pain et al.; "An Enhanced-Performance CMOS Imager with a Flushed-Reset Photodiode Pixel"; Jan. 2003; IEEE Transactions on Electron Devices; vol. 50, No. 1; pp. 48-56.*

Pain et al.; "Reset Noise Suppression In Two-Dimensional CMOS Photodiode Pixels through Column-based Feedback-Reset"; IEEE; 2002.*

* cited by examiner

METHOD AND APPARATUS OF CONTROLLING A PIXEL RESET LEVEL FOR REDUCING AN IMAGE LAG IN A CMOS SENSOR

CROSS-REFERENCE TO RELATED APPLICATION

This application claims the priority benefit of U.S Provisional Application Ser. No. 60/217,534, filed Jul. 12, 2000.

BACKGROUND OF THE INVENTION

1. Field of Invention

The present invention relates to a pixel reset level control, and more particularly, to reducing image lag in CMOS active pixel sensors at low light levels by controlling the reset level.

2. Description of Related Art

Image acquisition can be achieved by various semiconductors. Some of the conventional devices are charge-coupled devices (CCDs), photodiode arrays, charge injection devices and hybrid focal plane arrays. Of these CCDs are frequently implemented, due to the fact that they represent a mature technology, are capable of large formats and very small pixel size and they facilitate noise-reduced charge domain processing techniques such as binning and time delay integration.

However, CCD imagers suffer from a number of drawbacks. For example, the signal fidelity of a CCD decreases as the charge transfer efficiency is raised to the power of the number of stages. Since CCDs use many stages, the CCD fabrication technique needs to be optimized for very efficient charge transfer efficiency. CCDs are also susceptible to radiation damage, require good light shielding to avoid smear and have high power dissipation for large arrays.

The image signal processing electronics required for the imager can be fabricated in CMOS. Each column of CCD pixels is transferred to a corresponding cell of a serial output register before being processed in off-chip signal processing electronics. This architecture limits the read-out frame rate, which an amplifier can handle proportional to the number of charge packets divided by the number of pixels in the imager.

Other types of imager devices have problems as well. Photodiode arrays can exhibit high kT/C noise. Photodiode arrays also suffer from lag. Charge injection devices also can have high noise. Hybrid focal plane arrays exhibit less noise but are prohibitively expensive for many applications and have relatively small array sizes.

Therefore, there is need for an improved image sensor that provides a reduced image lag in CMOS active pixel sensors at low light levels.

SUMMARY OF THE INVENTION

To achieve these and other advantages and in order to overcome the disadvantages of the conventional image sensor in accordance with the purpose of the invention as embodied and broadly described herein, the present invention provides a method and apparatus for reducing image lag in CMOS active pixel sensors at low light levels by controlling the reset level.

A CMOS image sensor pixel consists of an imaging device such as a photodiode (PD), a reset transistor, a readout transistor and a selection transistor. All of the transistors are of the same type, for example n-channel, due to area limitations. The drains of the readout and reset transistors are connected to the positive supply (VDD).

The operation of the image sensor is as follows. Signal charge integration begins when PD is reset (to Vrst1) by pulsing the reset gate (RST) high. During charge integration, photo-generated electrons are accumulated on the photodiode, making the PD voltage decrease. When the pixel is accessed for readout, first the signal level (Vsig) is sampled. Then the pixel is reset again and the new reset level (Vrst2) is sampled. Ideally Vrst1 and Vrst2 are the same, and Vrst-Vsig corresponds to the photo-generated signal in the pixel.

If the high level of the reset gate is VDD, the reset transistor turns off slowly as the PD voltage reaches VDD-Vr during rest. Vt is the reset transistor threshold voltage. The final voltage on PD will depend on the width of the reset pulse as well as the starting voltage of PD. This will be referred to as "soft reset". If for example a pixel is bright in one frame but dark in the next, the signal that is measured Vsig-Vrst2 will be higher than the actual accumulated signal Vsig-Vrst1. Similarly, if a pixel is dark in one frame but bright in the next, the measured signal will be lower than the actual accumulated signal. The measured signal can take several frames to match the actual accumulated signal. This appears as lag in the image. Lag is more visible in dark images than in bright images for several reasons. The amount of lag is a larger percentage of the signal in dark images. Amplification of dark images makes lag even more visible in the final image.

The problem of image lag can be avoided by ensuring that the reset level is independent of the preceding signal level. Always resetting PD to a fixed voltage will be referred to as "hard reset". One method is to connect the drain of the reset transistor to a voltage VR that is lower than VDD-Vt.

The maximum signal swing is limited by the reset level and the column readout amplifier. If the column circuits are not modified, using hard reset can reduce the maximum signal swing. However in dark images only a portion of the full scale is used. For example if the image is amplified by a gain of 4, the usable signal swing in the pixel is only 25% of the full scale. Therefore the amplifier gain setting can be used to determine whether to use hard reset or soft reset. The reset drain voltage VRD can be switched from VDD to VR at the edge of the pixel array. Therefore the only modification necessary in the pixel is an extra supply line and contact to the reset drain.

In a color sensor, the different color pixels will go through different gains. For example a sensor with red (R), green (G), and blue (B) pixels will go through gains gr, gg, and gb respectively. The reset drain level can be determined by using the gain of only one color, for example green. Another method would be to use the middle gain. Yet another method is to change VRD only when all three gains satisfy the threshold conditions. These different methods affect only the control of the sensor either by the host or the on-chip control block but does not affect the pixel design.

It can be observed across technologies and pixel designs that the reset noise associated with soft reset is lower than the expected kT/C noise. Hard reset on the other hand will show the full kT/C noise. The effect of lag on an amplified dark image looks worse to a human observer than kT/C noise. The method of using hard or soft reset dependent on signal level improves image quality at low light levels without compromising performance at high illumination.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
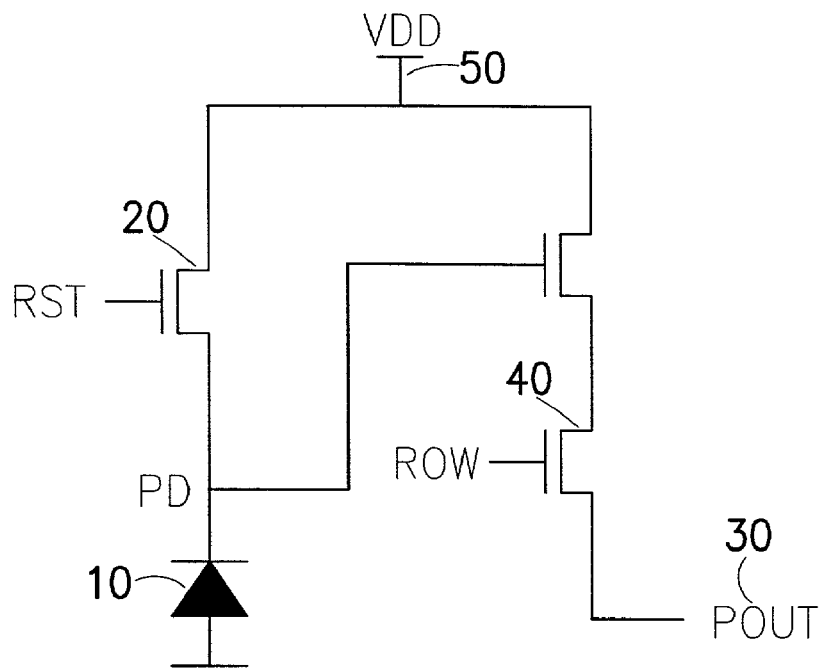
FIG. 1 is a circuit diagram illustrating a CMOS photodiode pixel.

Reference will now be made in detail to the preferred embodiments of the present invention, examples of which are illustrated in the accompanying drawings. Wherever possible, the same reference numbers are used in the drawings and the description to refer to the same or like parts.

Refer to FIG. 1, which is a circuit diagram illustrating a CMOS photodiode pixel. A CMOS image sensor pixel consists of an imaging device such as a photodiode (PD) 10, a reset transistor 20, a readout transistor 30 and a selection transistor 40. All of the transistors are of the same type, for example n-channel, due to area limitations. The drains of the readout and reset transistors are connected to the positive supply (VDD) 50.

The operation of the image sensor is as follows. Signal charge integration begins when PD 10 is reset (to Vrst1) by pulsing the reset gate (RST) 20 high. During charge integration, photo-generated electrons are accumulated on the photodiode 10, making the PD voltage decrease. When the pixel is accessed for readout, first the signal level (Vsig) is sampled. Then the pixel is reset again and the new reset level (Vrst2) is sampled. Ideally Vrst1 and Vrst2 are the same, and Vrst-Vsig corresponds to the photo-generated signal in the pixel.

Figure 2:
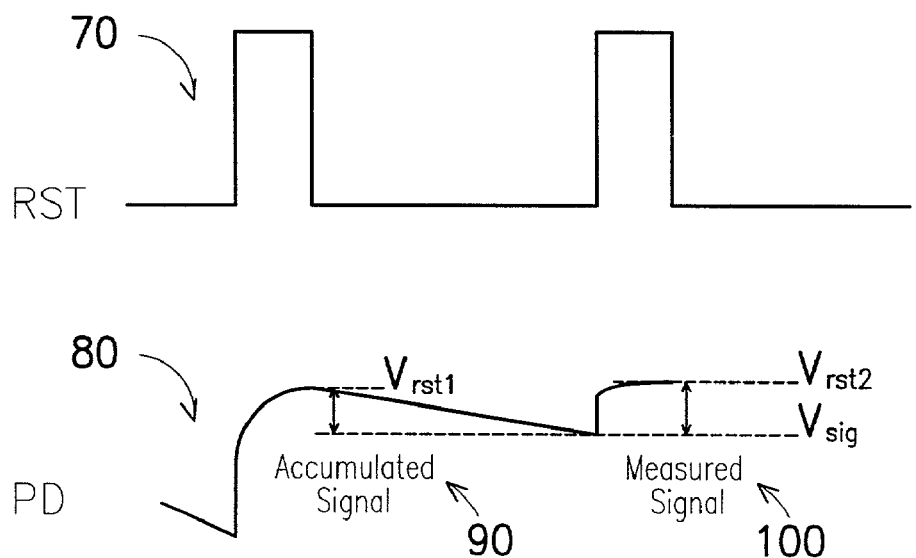
FIG. 2 is a timing diagram illustrating timing showing photodiode reset and signal levels according to an embodiment of the present invention.

Refer to FIG. 1, which is a circuit diagram illustrating a CMOS photodiode pixel and FIG. 2, which is a signal diagram illustrating timing showing photodiode reset and signal levels according to an embodiment of the present invention.

If the high level of the reset gate is VDD, the reset transistor 20 turns off slowly as the PD voltage reaches VDD-Vr duering reset. Vt is the reset transistor threshold voltage. The final voltage on PD will depend on the width of the reset pulse 70 as well as the starting voltage of PD 80. This will be referred to as "soft reset". If for example a pixel is bright in one frame but dark in the next, the signal that is measured Vsig-Vrst2 100 will be higher than the actual accumulated signal Vsig-Vrst1 90.

Figure 3:
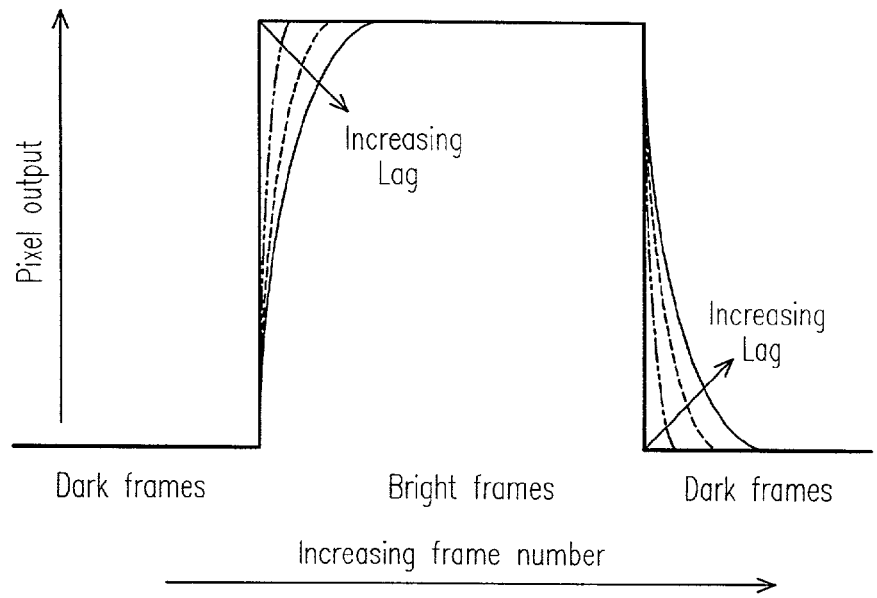
FIG. 3 is a diagram illustrating image lag according to an embodiment of the present invention.

Refer to FIG. 3, which is a diagram illustrating image lag.

Similarly, if a pixel is dark in one frame but bright in the next, the measured signal will be lower than the actual accumulated signal. The measured signal can take several frames to match the actual accumulated signal. This appears as lag in the image. Lag is more visible in dark images than in bright images for several reasons. The amount of lag is a larger percentage of the signal in dark images. Amplification of dark images makes lag even more visible in the final image.

The problem of image lag can be avoided by ensuring that the reset level is independent of the preceding signal level. Always resetting PD to a fixed voltage will be referred to as "hard reset". One method is to connect the drain of the reset transistor to a voltage VR that is lower than VDD-Vt.

The maximum signal swing is limited by the reset level and the column readout amplifier. If the column circuits are not modified, using hard reset can reduce the maximum signal swing. However in dark images only a portion of the full scale is used. For example if the image is amplified by a gain of 4, the usable signal swing in the pixel is only 25% of the full scale. Therefore the amplifier gain setting can be used to determine whether to use hard reset or soft reset.

Figure 4:
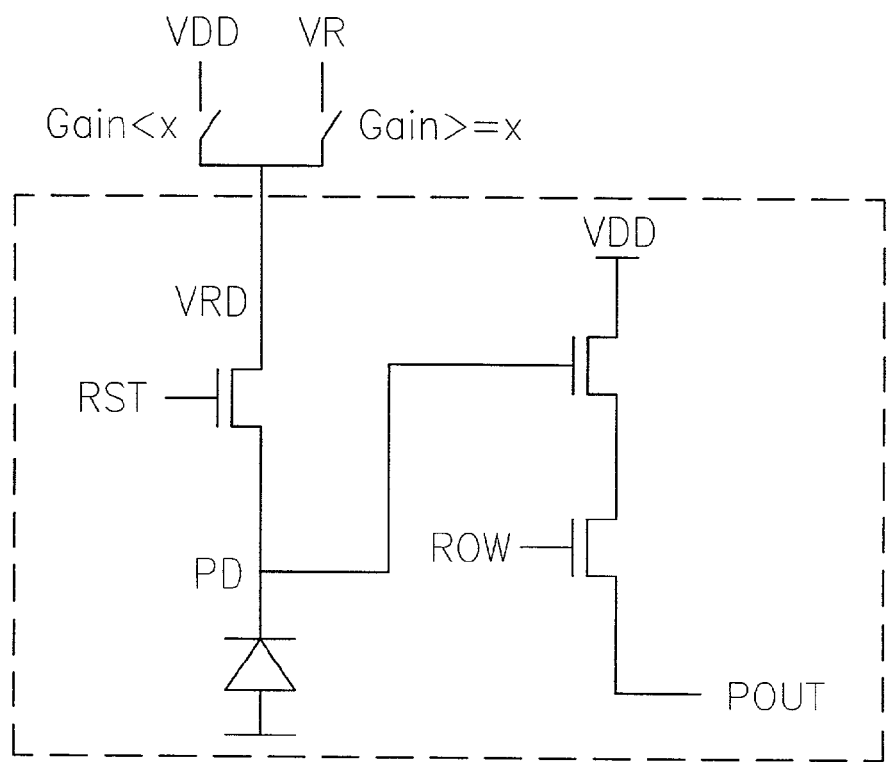
FIG. 4 is a circuit diagram illustrating a CMOS photodiode pixel to reduce lag according to an embodiment of the present invention.

Refer to FIG. 4, which is a circuit diagram illustrating a CMOS photodiode pixel to reduce lag according to an embodiment of the present invention.

The reset drain voltage VRD can be switched from VDD to VR at the edge of the pixel array. Therefore the only modification necessary in the pixel is an extra supply line and contact to the reset drain.

In a color sensor, the different color pixels will go through different gains. For example a sensor with red (R), green (G), and blue (B) pixels will go through gains gr, gg, and gb respectively. The reset drain level can be determined by using the gain of only one color, for example green.

Another method would be to use the middle gain. Yet another method is to change VRD only when all three gains satisfy the threshold conditions. These different methods affect only the control of the sensor either by the host or the on-chip control block but does not affect the pixel design.

It can be observed across technologies and pixel designs that the reset noise associated with soft reset is lower than the expected kT/C noise. Hard reset on the other hand will show the full kT/C noise. The effect of lag on an amplified dark image looks worse to a human observer than kT/C noise. The method of using hard or soft reset dependent on signal level improves image quality at low light levels without compromising performance at high illumination.

Therefore, the present invention provides a method and apparatus for reducing image lag in CMOS active pixel sensors at low light levels by controlling the reset level. By ensuring that the reset level is independent of the preceding signal level, the problem of image lag can be avoided. Always resetting a photodiode to a fixed voltage is a hard reset. The maximum signal swing is limited by the reset level and the column readout amplifier. If the column circuits are not modified, using hard reset can reduce the maximum signal swing. However in dark images only a portion of the full scale is used. Therefore the amplifier gain setting can be used to determine whether to use a hard reset or soft reset. This method and apparatus for using hard or soft reset dependent on signal level improves image quality at low light levels without compromising performance at high illumination.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An CMOS image sensor wherein image lag at low light levels is reduced by controlling a reset level, and wherein an amplifier gain setting is used for determining whether to use a hard reset or a soft reset.

2. An improved CMOS image sensor wherein image quality is improved at low light levels without compromising performance at high illumination by using a hard or soft reset dependent on a gain signal level.

3. An image CMOS sensor with reduced image lag comprising:
   an imaging device for acquiring image data;
   a reset transistor for resetting the image device;
   a readout transistor for providing pixel information as an output;
   a selection transistor for selecting between imaging devices, wherein image lag is reduced by controlling a reset level; and
   an amplifier gain setting for determining whether to use a hard reset or a soft reset.

4. The CMOS image sensor of claim 3, wherein the imaging device is a photodiode.

5. The CMOS image sensor of claim 3, wherein all transistors are of same type.

6. The CMOS image sensor of claim 3, wherein the reset level is independent of a preceding signal level.

7. The CMOS image sensor of claim 3, wherein a drain of the reset transistor is connected to a voltage that is less than a supply voltage minus a threshold voltage.

8. The CMOS image sensor of claim 3, wherein a reset drain voltage is switched between a supply voltage and a voltage that is less than the supply voltage minus a threshold voltage.

9. The CMOS image sensor of claim 3, wherein a reset drain level is determined by using gain of one color of pixel.

10. The CMOS image sensor of claim 3, wherein a reset drain level is determined by using a middle gain.

11. The CMOS image sensor of claim 3, wherein a reset drain level is changed only when gains of all color of pixels satisfy threshold conditions.

12. A CMOS image sensor with reduced image lag comprising:
    an imaging device for acquiring image data;
    a reset transistor for resetting the imaging device;
    a readout transistor for providing pixel information as an output; and
    a selection transistor for selecting between imaging devices, wherein image lag is reduced by controlling a reset level which is switchable between a supply voltage and a supply voltage minus a threshold voltage of the reset transistor; and
    an amplifier gain setting for determining whether to use a hard reset or a soft reset.

13. The CMOS image sensor of claim 12, wherein the imaging device is a photodiode.

14. The CMOS image sensor of claim 12, wherein all transistors are of same type.

15. The CMOS image sensor of claim 12, wherein the reset level is independent of a preceding signal level.

16. The CMOS image sensor of claim 12, wherein a drain of the reset transistor is connected to a voltage that is less than a supply voltage minus a threshold voltage.

17. The CMOS image sensor of claim 12, wherein a reset drain voltage is switched between a supply voltage and a voltage that is less than the supply voltage minus a threshold voltage.

18. The CMOS image sensor of claim 12, wherein a reset drain level is determined by using gain of one color of pixel.

19. The CMOS image sensor of claim 12, wherein a reset drain level is determined by using a middle gain.

20. The CMOS image sensor of claim 12, wherein a reset drain level is changed only when gains of all color of pixels satisfy threshold conditions.

* * * * *